United States Patent
Gotanda et al.

(10) Patent No.: US 6,712,411 B2
(45) Date of Patent: Mar. 30, 2004

(54) BUMPER DEVICE FOR VEHICLES AND BUMPER STAY

(75) Inventors: Terutsugu Gotanda, Kariya (JP); Shinichi Haneda, Anjo (JP); Kazuo Mori, Kariya (JP); Kazunari Azuchi, Himi (JP); Kiyoichi Kita, Aichi-ken (JP); Kazunobu Nuno, Toyota (JP)

(73) Assignees: Aisin Seiki Kabushiki Kaisha, Kariya (JP); Aisin Keikinzoku Kabushiki Kaisha, Shinminato (JP)

( * ) Notice: Subject to any disclaimer, the term of this patent is extended or adjusted under 35 U.S.C. 154(b) by 0 days.

(21) Appl. No.: 10/206,327

(22) Filed: Jul. 29, 2002

(65) Prior Publication Data

US 2003/0034661 A1 Feb. 20, 2003

(30) Foreign Application Priority Data

Jul. 30, 2001 (JP) ........................................ 2001-230556
May 28, 2002 (JP) ........................................ 2002-154129

(51) Int. Cl.$^7$ ............................................... B60R 19/28
(52) U.S. Cl. ...................... 293/155; 293/132; 293/133; 293/154; 296/187.09; 296/203.02
(58) Field of Search ................................ 293/132, 133, 293/102, 155, 154; 296/189, 203.02, 187.09, 187.11

(56) References Cited

U.S. PATENT DOCUMENTS

| | | | | |
|---|---|---|---|---|
| 3,930,665 A | * | 1/1976 | Ikawa | 293/132 |
| 4,252,355 A | * | 2/1981 | Goupy et al. | 293/132 |
| 4,413,856 A | * | 11/1983 | McMahan et al. | 293/132 |
| 4,427,225 A | * | 1/1984 | Bauer et al. | 293/132 |
| 4,468,052 A | * | 8/1984 | Koike | 293/132 |
| 5,727,826 A | * | 3/1998 | Frank et al. | 293/102 |
| 5,876,078 A | * | 3/1999 | Miskech et al. | 293/133 |
| 6,000,738 A | * | 12/1999 | Stewart et al. | 293/102 |
| 6,217,089 B1 | * | 4/2001 | Goto et al. | 293/102 |
| 6,231,095 B1 | * | 5/2001 | Chou et al. | 293/133 |
| 6,334,638 B1 | * | 1/2002 | Yamamuro et al. | 293/133 |
| 6,343,820 B1 | * | 2/2002 | Pedersen | 293/102 |
| 6,357,816 B1 | * | 3/2002 | Porter | 293/102 |
| 6,409,239 B1 | * | 6/2002 | Tjoelker et al. | 293/133 |
| 6,422,604 B2 | * | 7/2002 | Lapic | 293/133 |
| 6,428,065 B2 | * | 8/2002 | Sato et al. | 293/121 |
| 6,481,690 B2 | * | 11/2002 | Kariatsumari et al. | 293/155 |
| 6,485,072 B1 | * | 11/2002 | Werner et al. | 293/132 |

FOREIGN PATENT DOCUMENTS

JP 2001-58550 A 3/2001

* cited by examiner

*Primary Examiner*—D. Glenn Dayoan
*Assistant Examiner*—Greg Blankenship
(74) *Attorney, Agent, or Firm*—Burns, Doane, Swecker & Mathis, L.L.P.

(57) ABSTRACT

A bumper device can reduce a weight of a reinforcement member more than a weight of a conventional reinforcement member while sufficiently absorbing a given impact energy. A size "b" between both side mounting portions where the reinforcement member is mounted on a stay is set greater than a size "a" between both side longitudinal wall portions of a side frame, both outer longitudinal walls of the stay are inclined such that both outer longitudinal walls are opened toward the reinforcement member, and the distance between the inner longitudinal walls is set substantially equal to the distance between the both side longitudinal wall portions of the side frame.

5 Claims, 4 Drawing Sheets

BUMPER DEVICE FOR VEHICLES AND BUMPER STAY

BACKGROUND OF THE INVENTION

1. Field of the Invention

The present invention relates to a bumper device for vehicles and a bumper stay structure therefor.

2. Description of the Related Art

Conventionally, there has been known a bumper device which is disclosed for example in Japanese Patent Laid-open publication No. 58550/2001.

FIG. 6 shows a bumper device 100 which constitutes such a prior art. The bumper device 100 includes a reinforcement member 130 which extends in the lateral direction of a vehicle and both end portions of the reinforcement member 130 is mounted on front end portions of side frames 150 of the vehicle by way of stays 140 which are fixedly secured to the reinforcement member 130.

Further, as shown in FIG. 6, when an impact force which exceeds a given value acts on the bumper device 100, the bumper device 100 makes the stays 140 and the reinforcement member 130 deformed into shapes as indicated by a chain double-dashed line so as to absorb impact energy whereby an impact force applied to an occupant can be lightened.

To absorb the impact energy by surely deforming the stays 140 when the impact force exceeding a given value acts on the bumper device 100, the strength of the stay 140 against the impact force is set smaller than the strength of the side frame 150 against the impact force.

Accordingly, in the known example, a width "d" of the stay 140 is set narrower than a width "c" of the side frame 150. Due to such a constitution, the stay side is deformed earlier than the side frame 150 and hence, it is possible to prevent the initial deformation from being generated at the vehicle side such as the side frame 150 or the like.

However, since the reinforcement member 130 is supported on the stays 140 having the narrow width, the deformation of the reinforcement member 130 is generated in a shape indicated by the chain double-dashed line shown in FIG. 6 and hence, the range of deformation is limited to peripheries of the stays 140 having the narrow width. In the method in which the given impact energy is absorbed by deforming the reinforcement member 130 in such narrow portions, it is necessary to set a load which is required for deformation of a unit area of the deformed portion to a large value. That is, a thickness of ribs or the like arranged in the inside of the reinforcement member 130 must be increased so as to increase the strength of the reinforcement member 130 in the deforming direction. Accordingly, there arises a problem that the weight of the reinforcement member 130 is increased.

SUMMARY OF THE INVENTION

In view of such circumstances, it is an object of the present invention to provide a bumper device which can sufficiently absorb given impact energy while making a weight of a reinforcement member smaller than that of a conventional reinforcement member.

For achieving such an object of the present invention, there is provided a bumper device including a reinforcement member which extends in the widthwise direction of a vehicle and stays which mount the reinforcement member to a structural body of the vehicle, wherein the improvement is characterized in that each stay includes a pair of first mounting portions which are connected to the reinforcement member and a pair of second mounting portions which are connected to the structural body, a width between the pair of first mounting portions is set greater than a width between the pair of second mounting portions in the widthwise direction of the vehicle, and each stay further includes at least a pair of longitudinal walls which connect the first mounting portions and the second mounting portions such that a distance between the longitudinal walls is expanded from the second mounting portions to the first mounting portions in the widthwise direction of the vehicle.

Due to such a constitution, when an impact force acts on the bumper device, the deformation is generated in a wide range of the reinforcement member so that given impact energy is absorbed.

Further, according to the present invention, in a bumper stay which is arranged between a reinforcement member extending in the widthwise direction of a vehicle and a side frame at a body side, the bumper stay is formed of a pressed or press molded product made of a sheet of steel plate and includes a plurality of ribs which extend in a spaced-apart manner in the forward and rearward direction of the vehicle, a connecting wall portion which connects one ends of respective ribs, and mounting lugs which are provided to one ends of inner and outer ribs in the widthwise direction of the vehicle whereby it is possible to provide a bumper stay for vehicle in which a hollow portion between respective ribs opens in the forward and rearward directions.

The bumper stay is molded from a sheet of steel plate and has the mounting lugs extended in the sideward directions from inner and outer ribs thereof and hence, it is possible to make the size between the mounting lugs greater than the size between the mounting portions to side members. The use of steel plate enables arbitrary selection of the inclination of the ribs and the arbitrary adjustment of the strength based on the plate thickness.

According to the present invention, in a bumper stay which is arranged between a reinforcement member extending in the widthwise direction of a vehicle and a side frame at a vehicle side, the bumper stay is formed of an extruded member made of aluminum alloy material and includes a front wall portion and a rear wall portion which extend in the widthwise direction of the vehicle and are spaced apart from each other and at least four ribs which connect the front and rear wall portions, the ribs form at least three hollow portions, the front wall portion is made longer than the rear wall portion in the widthwise direction of the vehicle, and both sides of the front wall portions form mounting lugs, whereby a bumper stay for vehicle in which the ribs disposed at the inside of the vehicle are inclined inwardly and the ribs disposed at the outside of the vehicle are inclined outwardly.

According to this bumper stay, since the front wall portion is made longer than the rear wall portion in the widthwise direction of the vehicle and the inner and outer ribs are inclined, a contact surface between the reinforcement member and the bumper stay can be increased so that it is possible to prevent a local deformation of the reinforcement member at the time of collision.

In this specification, the description is made with respect to a case that the reinforcement member (bumper reinforcing member) is arranged at the front side of the vehicle and hence, the "front side" means the front side of the vehicle and the "rear side" means the rear side of the vehicle in this specification. However, in a case that the reinforcement member (bumper reinforcing member) is arranged at the rear side of the vehicle, the "front side" means the rear side of the vehicle and the "rear side" means the front side of the vehicle in this specification. That is, the present invention includes both examples.

DESCRIPTION OF THE PREFERRED EMBODIMENTS

Preferred embodiments of the present invention are explained in conjunction with attached drawings.

Figure 1:
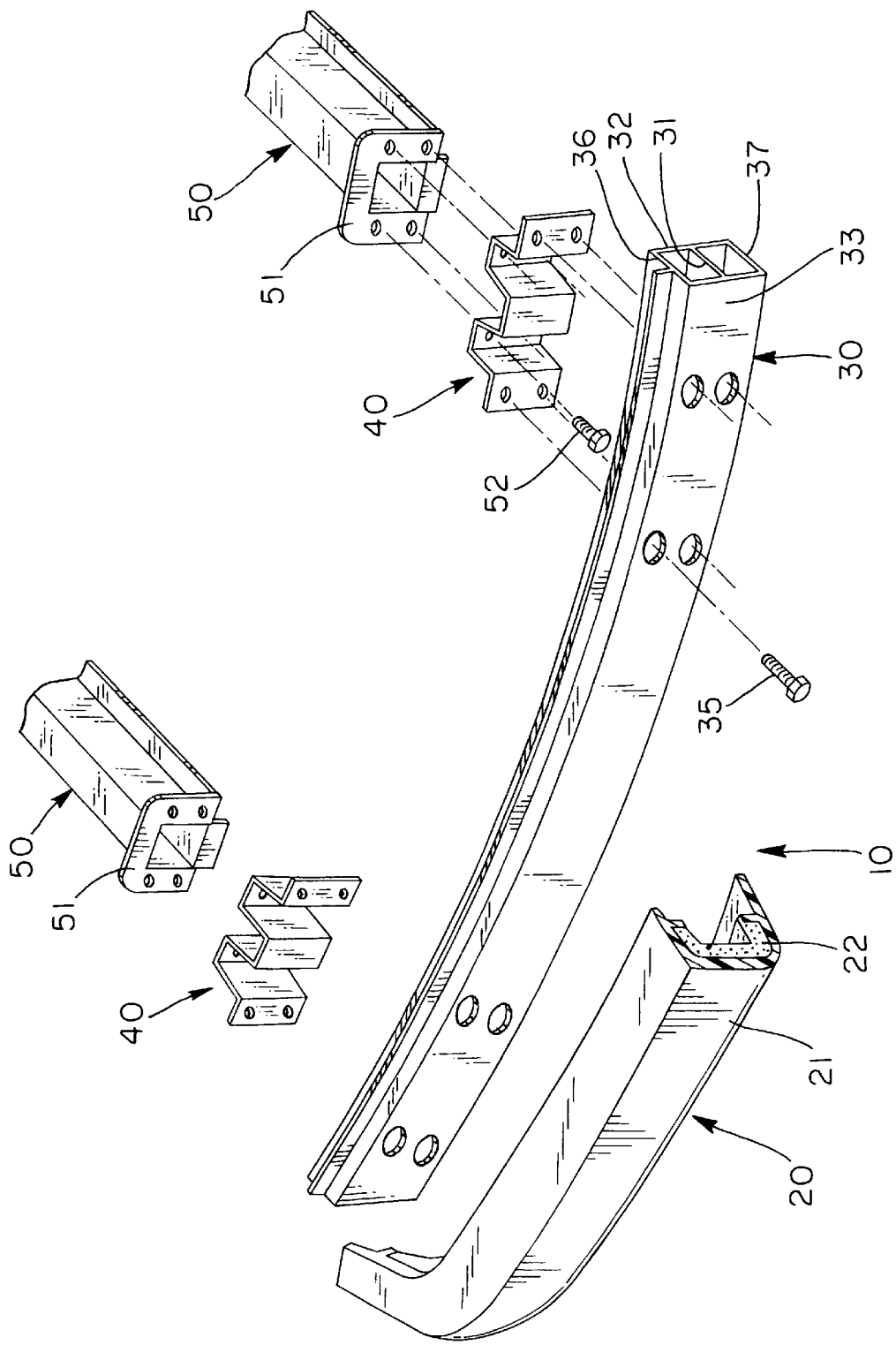
FIG. 1 is an exploded perspective view of the first embodiment of a bumper device according to the present invention.

As shown in FIG. 1, bumper devices 10 for vehicles are mounted on a front portion and a rear portion of the vehicle, respectively such that they extend in the widthwise direction. These bumper devices 10 are used as a rear bumper and a front bumper.

The bumper device 10 includes a primary impact energy absorbing body 20 which is constituted of a front skin member 21 and a pad member 22 and forms a cover member, a reinforcement member 30 which is assembled to the primary impact energy absorbing body 20 such that the reinforcement member 30 is fitted into a back surface of the primary impact energy absorbing body 20, and bumper stays 40 which are mounted on the neighborhoods of both ends of the reinforcement member 30 by using bolts 35. On the other hand, side members, that is, side frames 50 which ensure the strength of a vehicle body are provided to both sides of the vehicle body. Further, flanges 51 to which the stays 40 are mounted are provided to end portions of the side frames 50.

The reinforcement member 30 is usually formed by extrusion process using aluminum alloy, exhibits a hollow and fixed cross-sectional shape having ribs 31 therein, and constitutes a strength imparting member of the bumper device 10. Various proposals have been made with respect to the number and direction of the ribs 31 and the number and the shape of the hollow portion.

In case that an impact load acts on the bumper device 10, when the magnitude of the load is equal to or below a given level, only the primary impact energy absorbing body 20 is subjected to the compressive deformation and absorbs the impact energy. When the magnitude of the load exceeds the given level, the hollow reinforcement member 30 is deformed such that the reinforcement member 30 collapses and absorbs the impact energy.

Figure 2:
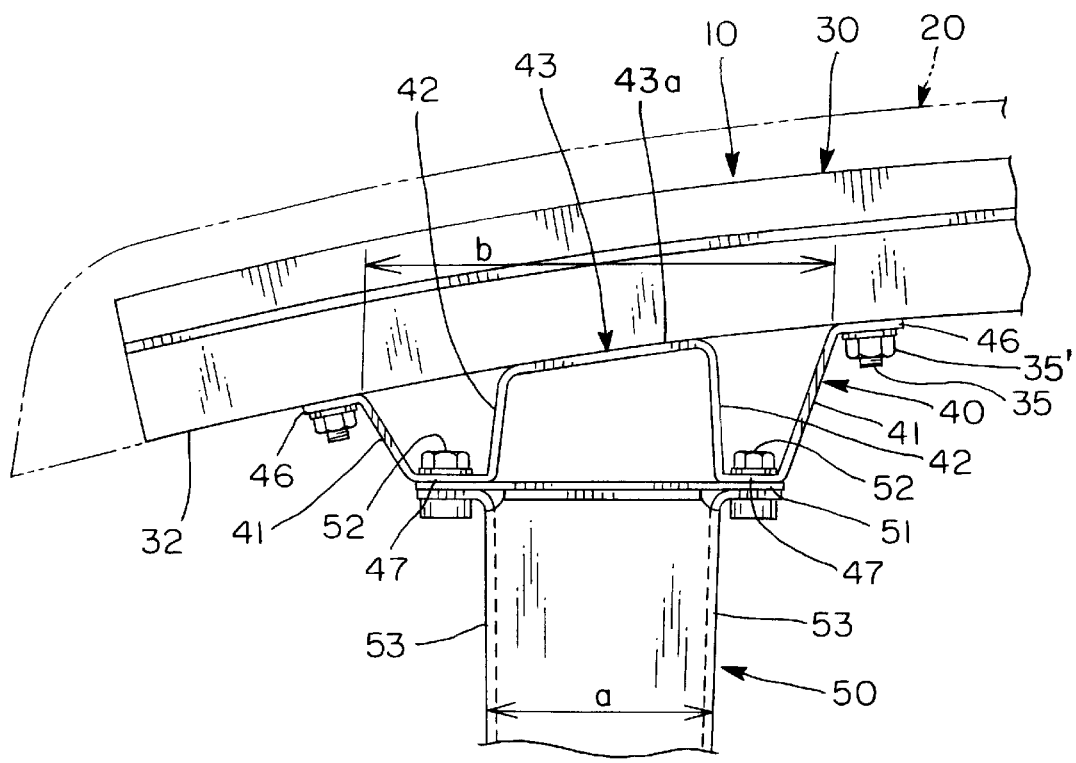
FIG. 2 is a plan view of the first embodiment of the bumper device according to the present invention.

In an example shown in FIG. 2, the stay 40 is formed by molding a steel plate having high strength into an approximately W shape by using a press process. The stay 40 is provided with two flange portions 46 at both sides thereof and a contact surface 43a at an approximately center portion between both flange portions 46 along a back surface 32 of the reinforcement member 30. The flange portions 46 and the contact surface 43a constitute a contact portion 43 which is in contact with the reinforcement member 30. Two flange portions 46 provided at both sides of the stay 40 are fixedly secured to the reinforcement member 30 using bolts 35 and nuts 35'.

Further, on portions of the stay 40 which are respectively disposed between the contact surface 43a and the flange portions 46, mounting portions 47 which come into contact with the flange 51 of the side frame 50 are formed. The mounting portions 47 are mounted on the flange 51 provided at the end portion of the side frame 50 using bolts 52.

Further, the stay 40 includes a pair of outer longitudinal walls 41 which connect both-side flange portions 46 and both mounting portions 47 and extend in the forward and rearward direction of the vehicle and a pair of inner longitudinal walls 42 which connect both vehicle-widthwise-direction ends of the contact surface 43a and both mounting portions 47 and extend in the frontward and backward direction of the vehicle. The mounting portions 47, 47 serve in connecting the end portions of the walls 41, 41 and the walls 42, 42.

The pair of outer longitudinal walls 41 are formed such that a distance in the lateral direction between them is expanded toward the reinforcement member 30. Further, the pair of inner longitudinal walls 42 are arranged at a position where they are connected to the mounting portions 47 such that a distance between the inner longitudinal walls 42 assumes a width which is substantially equal to a width "a" between both side longitudinal wall portions 53 of the side frame 50 as shown in FIG. 2.

Due to such a constitution, the impact load which is transmitted from the contact surface 43 to the stay 40 is efficiently transmitted to the both side longitudinal wall portions 53 of the side frame 50 by way of the inner longitudinal walls 42.

Further, as shown in FIG. 2, the pair of outer longitudinal walls 41 of the stay 40 are configured such that the distance between them in the lateral direction is expanded toward the reinforcement member 30 and the pair of outer longitudinal walls 41 support the reinforcement member 30 with a width "b" (the width of the contact portion 43 which substantially receives an impact force) which is wider than the width "a" of the side frame 50.

Figure 3:
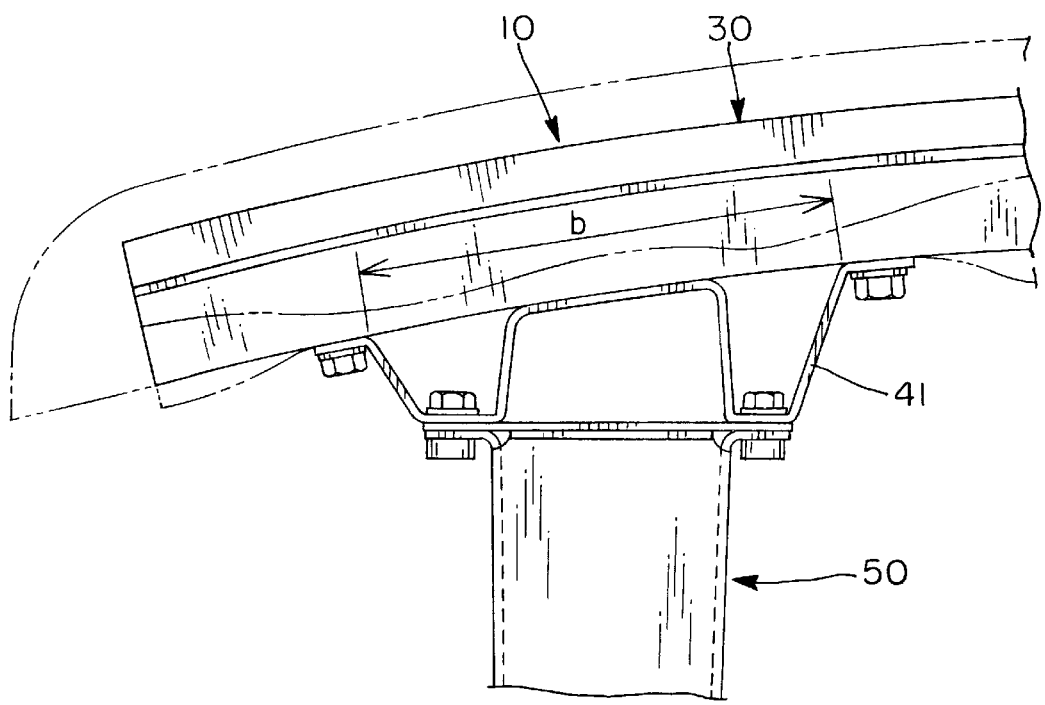
FIG. 3 is a view showing a shape of the bumper device shown in FIG. 2 after deformation.

Due to such a constitution, when the impact load exceeding the give value acts on the bumper device 10, as indicated by a chain double-dashed line shown in FIG. 3, it is possible to make the deformation generated in a wide range of the reinforcement member 30 which is supported by the stay 40 with the width "b".

Further, the strength of the stay 40 against the impact load is set such that the strength is sufficiently larger than the strength of the reinforcement member 30 against the impact load so that even when the load which deforms the reinforcement member 30 acts on the stay 40, the stay 40 is not deformed.

By setting the strength of the reinforcement member 30 in this manner, the present invention adopts the example in which members which receive damages due to the collision of the vehicle are limited to the primary impact energy absorbing body 20 and the reinforcement member 30 so that repairing after a collision accident can be easily performed by exchanging these parts.

The deformation strength of the reinforcement member 30 against the impact load is tested based on a collision testing method which is stipulated in view of safety standards of vehicles and the like and is set to a value which generates a given load.

As mentioned above, with respect to the reinforcement member 30 which is configured to make the deformation applied in a wide range, compared to a case of the previously mentioned prior art in which the reinforcement member is deformed in a narrow range so as to absorb energy generated at the time of collision, the strength per a unit area of the deformed portion can be weakened. That is, the respective ribs 31 and the upper and lower walls 36, 37 of the reinforcement member 30 can be made thin and light-weighted than those of the prior art such that these parts properly support the load.

Further, in the bumper device of the present invention, the outer walls 41 of the stay 40 are formed such that they are expanded toward the reinforcement member 30. Accordingly, the length of a portion of the reinforcement member 30 which is sandwiched by the both side stays 40 is shorter than a length of a corresponding portion of a reinforcement member of the above-mentioned prior art. From a general formula of the Strength of Material, the deflection when a load is applied to the center of a beam which is supported at both end thereof is proportional to the third powers of a distance between supporting points. In the constitution of the present invention in which the length of the portion of the reinforcement member 30 which is sandwiched by the both side stays 40 is shortened, such a constitution functions to make the deflection of the reinforcement member 30 difficult so that the wall thickness of the reinforcement member 30 can be made further thinner and light-weighted.

The manner of operation of the bumper device 10 having such a constitution is explained hereinafter.

Figure 4:
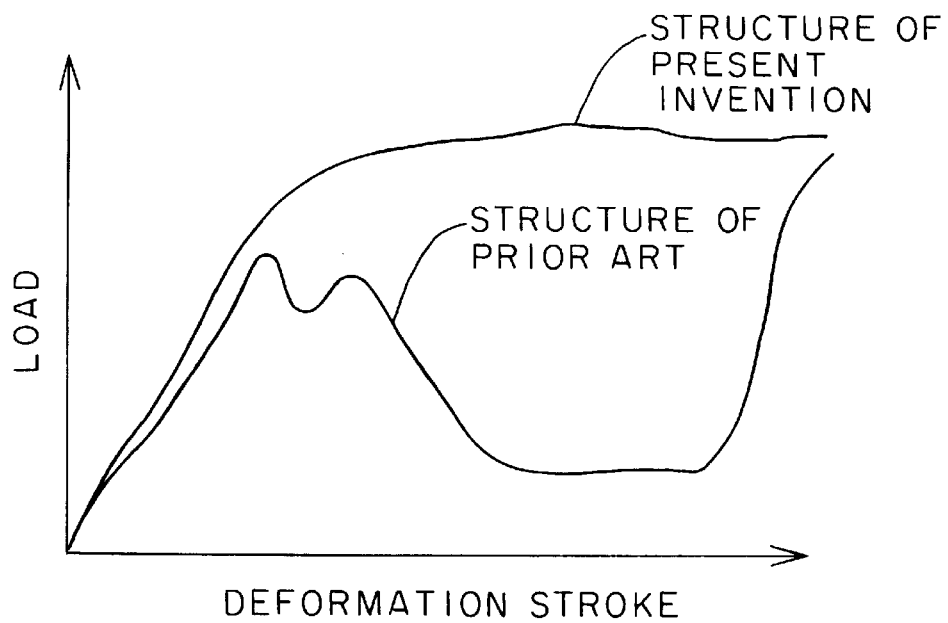
FIG. 4 is a graph showing load-deformation stroke characteristics of the bumper device according to the present invention and a bumper device according to a prior art in comparison.
Figure 6:
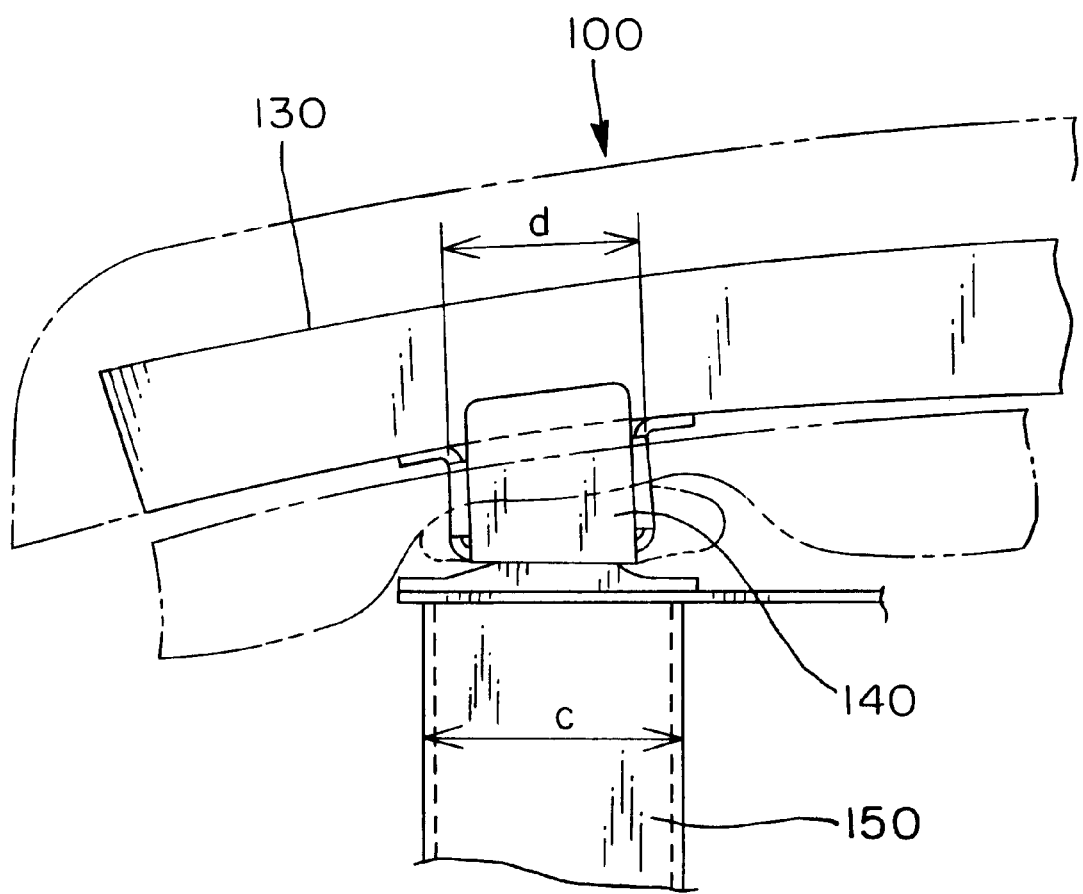
FIG. 6 is a plan view of a bumper device according to a prior art.

FIG. 4 shows load-deformation stroke characteristics which the bumper device of the present invention exhibits and load-deformation stroke characteristics which the bumper device of the prior art (FIG. 6) exhibits in comparison.

In this case, for facilitating the comparison, the weight of the reinforcement member 130 of the bumper device according to the prior art is reduced such that the reduced weight becomes equal to the weight of the reinforcement member 30 of the present invention.

As can be understood from FIG. 4, with respect to the structure of the present invention, the deformation spreads in a wide range of the reinforcement member 30 so that the high load can be maintained even when the deformation progresses. The maintenance of high load brings about the efficient absorption of the impact energy. On the other hand, when the reinforcement member is supported in a narrow range so that the deformation is limited in a narrow range as in the case of the structure of the prior art, the attainable load is small. Further, when the deformation progresses, the structure cannot maintain the increased load and hence, the load is drastically decreased. Accordingly, the absorption efficiency of impact energy is largely reduced.

Figure 5:
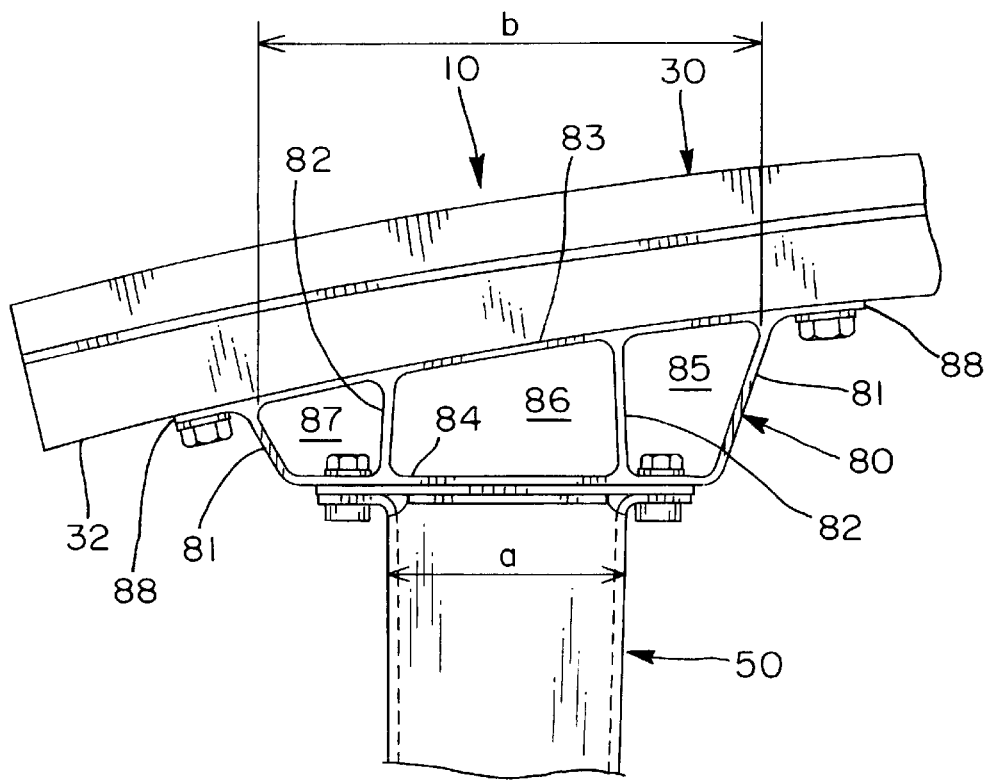
FIG. 5 is a plan view showing a second embodiment of the bumper device according to the present invention.

FIG. 5 shows a second embodiment of the present invention. The above-mentioned bumper device of the first embodiment uses the stay 40 which is formed by bending the steel plate having high strength in an approximately W shape. However, as in the case of a stay 80 of this embodiment, the stay may be formed by extrusion molding process by using an aluminum light alloy.

Also in this embodiment, in the same manner as the stay 40, the stay 80 is configured to include a pair of outer longitudinal walls 81 and a pair of inner longitudinal walls 82. Due to such a constitution, an impact load is efficiently transmitted to the side frame 50 and the deformation of the reinforcement member 30 is generated in a wide range so that the advantageous effects of the present invention are obtained.

In the example shown in FIG. 5, the stay 80 includes a front-wall portion 83 extending in the widthwise direction of the vehicle, a rear wall portion 84 spaced apart from the front-wall portion 83 and extending in the widthwise direction of the vehicle, and at least four longitudinal walls which connect the front and rear wall portions, that is, ribs 81, 82, thus forming three hollow portions 85, 86, 87.

The size of the front wall portion 83 in the widthwise direction of the vehicle is longer than the size of the rear wall portion 84 in the widthwise direction of the vehicle, and the outer longitudinal walls, that is, the ribs 81, 81 which are inclined such that they are opened toward the reinforcement member 30 side extend from both end portions of the rear wall portion 84 to inner sides of both ends of the front wall portion 83. Portions of the front wall portions 83 outside the outer longitudinal walls, that is, the ribs 81 constitute mounting lugs 88, 88 for the reinforcement member 30. The mounting lugs 88, 88 are fixedly secured to the reinforcement member 30 using bolts and nuts.

The inclination of the outer longitudinal walls, that is, the ribs 81, 81 is equal to the inclination of the outer longitudinal walls 41, 41 of an example shown in FIG. 2. The example shown in FIG. 5 corresponds to a constitution in which the mounting lugs 46, 46 and the contact surface 43a in the example of FIG. 2 are integrally connected to each other.

Also in the example shown in FIG. 5, in the same manner as the example shown in FIG. 2, the dimensional relationship of b>a is established so that the load acts on the inner longitudinal walls 82, 82 is efficiently transmitted to both longitudinal wall portions of the side frame 50.

The load-deformation stroke characteristics of the example shown in FIG. 5 can realize the deformation of the reinforcement member 30 in a wide range as shown in FIG. 4 so that even when the deformation progresses, it is possible to maintain the high load.

According to the present invention, with respect to the impact force which acts on the bumper device, the deformation of the reinforcement member is generated in a wide range so as to absorb the given impact energy and hence, it is possible to reduce the weight of the reinforcement member compared to the reinforcement member of the prior art and it is also possible to sufficiently absorb the given impact energy.

As many apparently widely different embodiments of the present invention can be made without departing from the spirit and scope thereof, it is to be understood that the invention is not limited to the specific embodiments thereof except as defined in the appended claims.

What is claimed is:

1. A bumper stay being arranged between a reinforcement member extending in the widthwise direction of a vehicle and a side frame at a vehicle body side, the bumper stay being formed of an extruded member made of aluminum alloy material, and includes a front wall portion and a rear wall portion which extend in the widthwise direction of the vehicle and are spaced apart from each other and at least four ribs which connect the front and rear wall portions, the ribs form at least three hollow portions, the front wall portion is longer than the rear wall portion in the widthwise direction of the vehicle and thus forming mounting lugs for the reinforcement member at both sides thereof, and the at least four ribs including at least two inner ribs inclined inwardly and at least two outer ribs inclined outwardly, the distance between the two inner ribs adjacent the rear wall portion being substantially equal to a width between longitudinally extending side wall portions of the side frame.

2. A bumper stay for vehicle according to claim 1, wherein the reinforcement member has a hollow cross-section including at least one interior rib.

3. A bumper stay for vehicle adapted to be arranged between a reinforcement member extending in the widthwise direction of a vehicle and a side frame at a vehicle body side, the bumper stay being a press molded product made of a sheet of steel plate and includes a plurality of ribs extending in a spaced-apart manner in the forward and rearward direction of the vehicle, the plurality of ribs including inner and outer ribs with respect to the widthwise direction of the vehicle, a connecting wall portion which connects one ends of respective ribs, and mounting lugs which are provided at one ends of the outer ribs, wherein hollow portions between respective ribs are each opened in the forward or rearward direction, wherein two of the inner ribs which form a hollow portion are positioned on extension lines of side wall portions of the side frame.

4. A bumper stay for vehicle according to claim 3, wherein the inner ribs are inclined inwardly and the outer ribs are inclined outwardly, and the mounting lugs are fixedly secured to the reinforcement member, and the connecting wall portion is integrally formed with one of the ribs having the mounting lugs and is fixedly secured to the side frame.

5. A bumper stay for vehicle according to claim 3, wherein the reinforcement member has a hollow cross-section including at least one interior rib.

* * * * *